United States Patent [19]

Ando et al.

[11] Patent Number: 4,599,274

[45] Date of Patent: Jul. 8, 1986

[54] PHOTO-CURABLE ADHESIVE COMPOSITION FOR GLASS LAMINATION AND LAMINATED GLASS AND PROCESS FOR ITS PRODUCTION

[75] Inventors: Toshihiro Ando; Yutaka Nakanishi; Kenkichi Ukita, all of Machida, Japan

[73] Assignee: Denki Kagaku Kogyo Kabushiki Kaisha, Tokyo, Japan

[21] Appl. No.: 585,255

[22] Filed: Mar. 1, 1984

[30] Foreign Application Priority Data

Mar. 11, 1983 [JP] Japan ................... 58-39116
Mar. 11, 1983 [JP] Japan ................... 58-39117
Jul. 4, 1983 [JP] Japan ................... 58-121239

[51] Int. Cl.$^4$ ............................. C08J 3/28; C08L 33/10
[52] U.S. Cl. ................................. 428/442; 156/327; 156/332; 428/447; 428/429; 522/40; 522/68; 522/79; 522/107; 522/108; 522/172
[58] Field of Search ................. 204/159.13, 159.23, 204/159.22; 428/429, 428, 441, 442; 156/331.3, 327, 332

[56] References Cited

U.S. PATENT DOCUMENTS

| | | | |
|---|---|---|---|
| 3,801,329 | 4/1974 | Sandner et al. | 204/159.23 |
| 3,827,957 | 8/1974 | McGinniss | 204/159.23 |
| 3,827,958 | 8/1974 | McGinniss | 204/159.23 |
| 3,840,448 | 10/1974 | Osborn et al. | 204/159.23 |
| 4,082,635 | 4/1978 | Fritz et al. | 204/159.13 |
| 4,272,586 | 6/1981 | Ando et al. | 204/159.23 |
| 4,277,593 | 7/1981 | Scheve | 204/159.23 |

*Primary Examiner*—Allan M. Lieberman
*Attorney, Agent, or Firm*—Oblon, Fisher, Spivak, McClelland & Maier

[57] ABSTRACT

A photo-curable adhesive composition for glass lamination, which comprises:

(A) 100 parts by weight of a (meth)acrylate monomer represented by the formula:

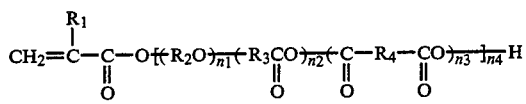

where $R_1$ is a hydrogen atom or a $CH_3$— group, each of $R_2$, $R_3$ and $R_4$ is a straight-chained or branched alkylene group, each of $n_1$ and $n_4$ is an integer of at least 1 and each of $n_2$ and $n_3$ is an integer of 0 or at least 1, and having a molecular weight of from about 116 to about 5,000;

(B) from 0.1 to 5 parts by weight of a photosensitizer;

(C) from 0 to 5 parts by weight of a silane coupling agent; and (D) from 0 to 100 parts by weight of a plasticizer.

9 Claims, No Drawings

PHOTO-CURABLE ADHESIVE COMPOSITION FOR GLASS LAMINATION AND LAMINATED GLASS AND PROCESS FOR ITS PRODUCTION

The present invention relates to an adhesive useful for the production of a laminated glass product. More particularly, the present invention relates to a photo-curable adhesive composition for glass lamination, a process for producing a laminated glass product by using such a photo-curable adhesive composition, and the laminated glass product which has superior cold resistance and transparency.

For the production of laminated glass, it is known to bond glass to glass by means of a film of an organic polymer such as polyvinylbutyral. However, when such an adhesive is employed, a complicated time-consuming process is required for the lamination.

In order to improve over the process, there has been an extensive research to develop liquid resins for glass lamination, and some of such liquid resins are practically in use.

As such resins, there may be mentioned an epoxy resin, an unsaturated polyester resin, a polyurethane resin and a silicone resin.

However, these resins usually require heat curing, and it usually takes a long time to cure them at room temperature. Further, the unsaturated polyester, epoxy and polyurethane usually contain an aromatic ring in their molecules, and accordingly when exposed to ultraviolet rays for an extended period of time, they tend to be colored brown, whereby the transparency will be deteriorated. Whereas, the silicone resin has a refractive index of about 1.40 which is substantially different from the refractive index (1.52) of glass, whereby there will be a drawback that the reflection at the interface of glass/adhesive will be great.

On the other hand, it has been proposed to use a photo-curable adhesive for glass lamination. For instance, a photo-curable adhesive composed of polyene/polythiol is practically used as an adhesive for lenses and exhibits excellent physical properties, but it has a drawback that the starting material is expensive.

Further, it has been proposed to use various (meth)acrylates for photo-curable adhesives. However, none of them fully satisfies the requirements for cold resistance and transparency.

Accordingly, it is an object of the present invention to overcome the above-mentioned drawbacks and to provide an adhesive composition for glass lamiantion which is capable of providing superior transparency, cold resistance and durability.

Namely, the present invention provides a photo-curable adhesive composition for glass lamination which comprises:

(A) 100 parts by weight of a (meth)acrylate monomer represented by the formula:

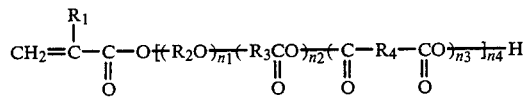 (I)

where $R_1$ is a hydrogen atom or a $CH_3$-group, each of $R_2$, $R_3$ and $R_4$ is a straight-chained or branched alkylene group, each of $n_1$ and $n_4$ is an integer of at least 1 and each of $n_2$ and $n_3$ is an integer of 0 or at least 1, and having a molecular weight of from about 116 to about 5,000;

(B) from 0.1 to 5 parts by weight of a photosensitizer;
(C) from 0 to 5 parts by weight, preferably from 0.1 to 5 parts by weight, of a silane coupling agent; and
(D) from 0 to 100 parts by weight of a plasticizer.

The present invention provides also a process for producing a lamianted glass product, which comprises laminating glass sheets by means of the above-mentioned photo-curable adhesive composition.

Further, the present invention provides a laminated glass product obtained by laminating glass sheets by means of the above-mentioned photo-curable adhesive composition.

Now, the present invention will be described in detail with reference to the preferred embodiments.

As the (meth)acrylate monomer (A) to be used in the present invention, there may be mentioned a polyetherdiol mono(meth)acrylate or a polyesterdiol mono(meth)acrylate, such as a mono- or poly-ethylene glycol mono(meth)acrylate, a mono- or poly-propylene glycol mono(meth)acrylate or mono- or poly-butylene glycol mono(meth)acrylate. In the above formula I, $R_2$, $R_3$ and $R_4$ may be different from one another so long as they are within the scope as defined by the present invention, as in the case of a glycol mono(meth)acrylate made of a block- or random-copolymer of ethylene oxide with propylene oxide. Further, the (meth)acrylate monomer may be composed of a single (meth)acrylate or a mixture of two or more (meth)acrylates.

Preferred specific examples of the (meth)acrylate monomer include 2-hydroxyethyl methacrylate, 2-hydroxypropyl methacrylate and a polypropylene glycol monomethacrylate. They may be used alone or in combinatioin as a mixture. When a (meth)acrylate having a molecular weight of from about 300 to about 1,000 is employed, no plasticizer may be required. When the molecular weight is lower than about 300, a suitable plasticizer such as polyethylene glycol or polypropylene glycol, or a (meth)acrylate having a higher molecular weight, may be incorporated to bring the molecular weight per (meth)acrylate group to a level of about 300 to about 1,000, whereby it will be possible to obtain a hardened product having a low shrinking rate, adequate flexibility at a low temperature and adequate strength at a high temperature.

It is particularly preferred to employ a (meth)acrylate monomer which is composed of (a) from 5 to 45 parts by weight of 2-hydroxyethyl methacrylate and/or 2-hydroxypropyl methacrylate and (b) from 55 to 95 parts by weight of a polypropylene glycol monomethacrylate having a molecular weight of from about 300 to about 1,000.

As the photosensitizer to be used in the present invention, there may be mentioned benzophenone, a benzoin alkyl ether and benzyl dimethyl ketal.

As the silane coupling agent for the present invention, there may be used any conventional silane coupling agents. However, particularly preferred is a silane coupling agent having a vinyl group, a methacryloyl group or a mercapto group. The silane coupling agent serves to improve the moisture resistnace and the durability.

As the plasticizer for the present invention, any plasticizer may be employed so long as it does not decrease the transparency (even at a low temperature) of the cured product of the adhesive composition. An aromatic plasticizer is likely to lead to coloring as time passes. From the viewpoints of the above-mentioned transparency and the bleeding at a high temperature, it is preferred to employ the following compounds as the plasticizer:

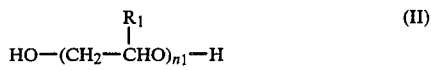

$$HO-(CH_2-CHO)_{n_1}-H \qquad (II)$$
$$\phantom{HO-(CH_2-CH}|\phantom{O)_{n_1}-H}$$
$$\phantom{HO-(CH_2-CHO)}R_1$$

where $R_1$ is a hydrogen atom or a methyl group and $n_1$ is an integer of at least 1. Among these plasticizers, the most preferred is a polypropylene glycol.

If necessary, other additives such as a radical polymerization stabilizer, a dyestuff or a filler which does not adversely affect the transparency, may be incorporated into the adhesive composition of the present invention.

Further, a (meth)acrylate monomer other than the above monomer (A) may be added in a small amount so long as it does not adversely affect the desired properties of the adhesive composition of the present invention.

The laminated glass product prepared by means of the adhesive composition of the present invention, is characterized in that it has superior transparency, heat and sound insulating properties and cold resistance, and it does not scatter when broken. The adhesive composition of the present invention may be used for the preparation of a laminated glass to be used for a door, a window or a water tank, or a safety glass for a vehicle or aircraft, or for the lamination of a non-reflecting glass on a display surface of a cathode ray tube.

Now, the present invention will be described in further detail with reference to Examples. However, it should be understood that the present invention is by no means restricted by these specific Examples.

The following test methods were employed in the Examples.

1. Heat cycle test

A heat cycle of one hour at a low temperature and one hour at a high temperature, was repeated 20 times, whereby the cracking of the glass, the cracks in the cured layer of the adhesive, the peeling of the adhesive layer from the glass and the color change were observed by naked eyes.

2. Cold resistance test

The test sample was left to stand at a predetermined temperature for 96 hours. The transparency (the presence or absence of white turbidity) of the cured adhesive was observed at a low temperature. After the sample returned to room temperature, it was subjected to the above heat cycle test.

3. Heat resistance test

The sample was left to stand at a predetermined temperature for 96 hours, then subjected to the above heat cycle test and further examined for the presence or absence of the bleeding.

4. Tensile strength

In accordance with ASTM D-1002-64, a pair of glass sheets each having a thickness of 3 mm, were bonded with a adhesive layer having a thickness of 3 mm by irradiating the layer for 5 minutes from a distance of 5 cm by means of 40 W black lamp to cure the adhesive. Then, the tensile strength was measured.

5. Transmittance

White glass sheets having a thickness of 3 mm were bonded with an adhesive layer having a thickness of 3 mm in the same manner as in the above item 4. The spectral transmittance was measured by means of W Beam Spectro photometer UV-200 manufactured by Shimadzu Corporation.

EXAMPLE 1

100 g of polyethylene glycol monomethacrylate (average molecular weight: 250), 1 g of benzoin methylether, 1 g of a silane coupling agent (A-174 manufactured by Nippon Unica K.K.), 75 g of polypropylene glycol (average molecular weight: 1,500) and 0.05 g of hydroquinone monomethyl ether were placed in a brown plastic bottle and stirred at 60° C. for 2 hours. The adhesive thereby obtained, was injected into a space between a pair of glass sheets, each having a thickness of 3 mm and a size of 100 mm×100 mm, with a spacer having a thickness of 3 mm, (the three sides thereof were sealed with a tape to prevent the leakage of the adhesive). The adhesive was irradiated for 5 minutes from a distance of 5 cm by means of 40 W black light and thereby cured.

The laminated glass was subjected to the heat cycle test with a cycle of −20° C. and +80° C., to a cold resistance test at −20° C. and to a heat resistance test at +80° C., whereby good results were obtained. Further, the tensile strength was measured and found to be 7 kg/cm². The transmittance was 89.5% (400 nm), 93.6% (500 nm), 96.1% (600 nm) and 96.5% (700 nm).

EXAMPLE 2

An adhesive comprising 100 g polypropylene glycol monomethacrylate (average molecular weight: 400), 1 g of benzoin methylether, 1 g of a silane coupling agent A-172 (manufactured by Nihon Unica K.K.) and 0.05 g of hydroquinone monomethyl ether, was prepared in the same manner as in Example 1, and a laminated glass was prepared in the same manner as in Example 1.

The laminated glass thereby obtained, was subjected to a heat cycle test with a cycle of −55° C. and +120° C., to a cold resistance test at −55° C. and to a heat resistance test at +120° C., whereby good results were obtained. The tensile strength was 7.5 kg/cm². The transmittance was 87.5% (400 nm), 94.3% (500 nm), 95.8% (600 nm) and 95.7% (700 nm).

EXAMPLE 3

An adhesive comprising 100 g of polypropylene glycol monomethacrylate (average molecular weight: 600), 10 g of 2-hydroxyethyl methacrylate, 1 g of benzoin ethyl ether, 1 g of a silane coupling agent A-172 and 0.5 g of hydroquinone monomethyl ether, was prepared in the same manner as in Example 1, and a laminated glass was prepared in the same manner as in Example 1.

The laminated glass thereby obtained, was subjected to a heat cycle test with a cycle of −55° C. and +120° C., to a cold resistance test at −55° C. and to a heat resistance test at +120° C., whereby good results were obtained. The tensile strength was 6.9 kg/cm². The transmittance was 87.9% (400 nm), 94.8% (500 nm), 96.5% (600 nm) and 96.6% (700 nm).

EXAMPLE 4

By using the photo-curable adhesive as used in Example 3, a glass panel coated with magnesium fluoride was bonded on a 14 inch cathode ray tube with an adhesive layer having a thickness of 3 mm. The bonding was conducted by irradiating the adhesive layer with ultraviolet rays at 4 mW/cm² for 15 minutes. The cathode ray tube thereby obtained, was subjected to a heat cycle test with a cycle of −55° C. and +120° C., to a cold resistance test at −55° C. and to a heat resistance test at 120° C., whereby good results were obtained. Further, the display image surface of this cathode ray tube showed little reflection.

EXAMPLE 5

An adhesive comprising 100 g of polypropylene glycol monomethacrylate (average molecular weight: 600), 10 g of 2-hydroxyethyl methacrylate, 1 g of benzoin ethyl ether and the silane coupling agent A-172 in each amount identified in Table 1, was prepared in the same manner as in Example 1. By using each adhesive thereby obtained, a laminated glass was prepared in the same manner as in Example 1.

Each laminated glass thereby obtained, was subjected to a moisture resistant test by leaving it to stand at 45° C. under relative humidity of 90% for 96 hours. The tensile strength of each laminated glass before and after the test is shown in Table 1.

TABLE 1

| Amount of A-172 (g) | 0 | 0.1 | 0.5 | 1.0 | 5.0 |
|---|---|---|---|---|---|
| Tensile strength (kg/cm$^2$) | | | | | |
| Before Test | 5.8 | 6.2 | 7.2 | 7.0 | 6.7 |
| After Test | 3.2 | 5.1 | 6.6 | 6.5 | 6.1 |

We claim:

1. A photo-curable adhesive composition for glass lamination, which comprises:

(A) 100 parts by weight of a (meth)acrylate monomer represented by the formula:

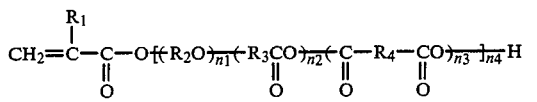
(I)

where $R_1$ is a hydrogen atom or a CH$_3$-group, each of $R_2$, $R_3$ and $R_4$ is a straight-chained or branched alkylene group, each of $n_1$ and $n_4$ is an integer of at least 1 and each of $n_2$ and $n_3$ is an integer of 0 or at least 1, and having a molecular weight of from about 116 to about 5,000;

(B) from 0.1 to 5 parts by weight of a photosensitizer;

(C) from 0.1 to 5 parts by weight of a silane coupling agent which improves moisture resistance and durability; and (D) from 0 to 100 parts by weight of a plasticizer that will not decrease the transparency of the adhesive.

2. The photo-curable adhesive composition according to claim 1, wherein the (meth)acrylate monomer is at least one member selected from the group consisting of (i) 2-hydroxyethyl methacrylate, (ii) 2-hydroxypropyl methacrylate and (iii) a polypropylene glycol monomethacrylate.

3. The photo-curable adhesive composition according to claim 1, wherein the (meth)acrylate monomer is composed of (a) from 5 to 45 parts by weight of 2-hydroxyethyl methacrylate and/or 2-hydroxypropyl methacrylate and (b) from 55 to 95 parts by weight of a polypropylene glycol monomethacrylate having a molecular weight of from about 300 to about 1,000.

4. The photo-curable adhesive composition according to claim 1, wherein the plasticizer is a compound represented by the formula:

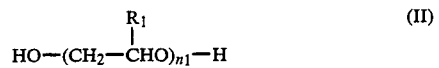
(II)

where $R_1$ is a hydrogen atom or a methyl group and $n_1$ is an integer of at least 1.

5. The photo-curable adhesive composition according to claim 1, wherein the plasticizer is a polypropylene glycol.

6. The photo-curable adhesive composition according to claim 1, wherein the photosensitizer is benzoin diethyl ether or benzyldimethyl ketal.

7. The photo-curable adhesive composition according to claim 1, wherein the silane coupling agent is a silane coupling agent having an organic group selected from the group consisting of a vinyl group, a methacryloyl group and a mercapto group.

8. A process for producing a laminated glass product, which comprises laminating glass sheets by means of the photo-curable adhesive composition as defined in claim 1.

9. A laminated glass product obtained by laminating glass sheets by means of the photo-curable adhesive composition as defined in claim 1.

* * * * *